United States Patent
Sato et al.

(10) Patent No.: US 11,402,281 B2
(45) Date of Patent: Aug. 2, 2022

(54) FORCE SENSOR INCLUDING A CAPACITANCE DETECTING UNIT CONFIGURED TO DETECT A CAPACITANCE CORRESPONDING TO A DISTANCE BETWEEN A FIRST ELECTRODE AND A SECOND ELECTRODE

(71) Applicant: ALPS ALPINE CO., LTD., Tokyo (JP)

(72) Inventors: Kunio Sato, Miyagi (JP); Daisuke Takai, Miyagi (JP); Kazuhito Oshita, Miyagi (JP); Hajime Shikata, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 177 days.

(21) Appl. No.: 16/517,860

(22) Filed: Jul. 22, 2019

(65) Prior Publication Data

US 2019/0339142 A1 Nov. 7, 2019

Related U.S. Application Data

(63) Continuation of application No. PCT/JP2018/009040, filed on Mar. 8, 2018.

(30) Foreign Application Priority Data

Mar. 25, 2017 (JP) .............................. JP2017-060242

(51) Int. Cl.
*G01L 1/14* (2006.01)
(52) U.S. Cl.
CPC ...................................... *G01L 1/14* (2013.01)
(58) Field of Classification Search
CPC ... G01L 1/205; G01L 1/06; G01L 1/14; G01L 1/142; G01L 1/146; G01L 5/165
See application file for complete search history.

(56) References Cited

U.S. PATENT DOCUMENTS 5,437,196 A * 8/1995 Okada .................... G01L 5/165
73/514.18
6,159,761 A * 12/2000 Okada ................. G01P 15/0802
438/462

(Continued)

FOREIGN PATENT DOCUMENTS

JP     4295883       7/2009
JP     2015-161531   9/2015

OTHER PUBLICATIONS

International Search Report dated Apr. 3, 2018 in PCT/JP2018/009040 filed on Mar. 8, 2018.

*Primary Examiner* — Tran M. Tran
(74) *Attorney, Agent, or Firm* — IPUSA, PLLC

(57) ABSTRACT

A force sensor includes a substrate; a first electrode fixed to a first area on the substrate; a second electrode fixed to a second area different from the first area on the substrate, the second electrode extending to a position higher than the first electrode; a capacitance detecting unit configured to detect a capacitance corresponding to a distance between the first electrode and the second electrode; and an operation member including a contact area that is in contact with the second electrode. At least one of the first electrode and the second electrode is provided in plurality. The second electrode is elastically deformed by a load applied to the second electrode by an operation with respect to the operation member, and the distance between the second electrode and the first electrode changes according to an elastic deformation of the second electrode.

6 Claims, 8 Drawing Sheets

(56) References Cited

U.S. PATENT DOCUMENTS

| | | | |
|---|---|---|---|
| 6,530,283 B2 | 3/2003 | Okada et al. | |
| 6,651,506 B2 * | 11/2003 | Lee | G01L 9/0042 |
| | | | 73/718 |
| 6,820,494 B2 * | 11/2004 | Morimoto | G01D 5/2417 |
| | | | 73/780 |
| 6,877,383 B2 * | 4/2005 | Horie | G01L 9/0073 |
| | | | 73/754 |
| 6,894,507 B2 * | 5/2005 | Morimoto | G01R 27/2605 |
| | | | 324/660 |
| 6,933,732 B2 * | 8/2005 | Morimoto | G01L 5/22 |
| | | | 324/661 |
| 7,121,147 B2 * | 10/2006 | Okada | G01L 5/165 |
| | | | 73/760 |
| 7,152,485 B2 * | 12/2006 | Okada | B81B 3/0021 |
| | | | 73/780 |
| 7,219,561 B2 * | 5/2007 | Okada | G01L 5/165 |
| | | | 73/862.043 |
| 7,395,721 B2 * | 7/2008 | Taniguchi | G01L 1/142 |
| | | | 73/780 |
| 7,533,582 B2 * | 5/2009 | Okada | G01L 1/144 |
| | | | 73/862.043 |
| 7,900,513 B2 * | 3/2011 | Okada | G01P 15/11 |
| | | | 73/504.04 |
| 8,966,996 B2 * | 3/2015 | Okada | G01L 1/14 |
| | | | 73/862.043 |
| 9,383,277 B2 * | 7/2016 | Okada | G01L 1/26 |
| 9,664,576 B2 | 5/2017 | Sato et al. | |
| 2002/0190727 A1 * | 12/2002 | Morimoto | G06F 3/0338 |
| | | | 324/661 |
| 2002/0194919 A1 * | 12/2002 | Lee | G01L 9/0042 |
| | | | 73/718 |

* cited by examiner

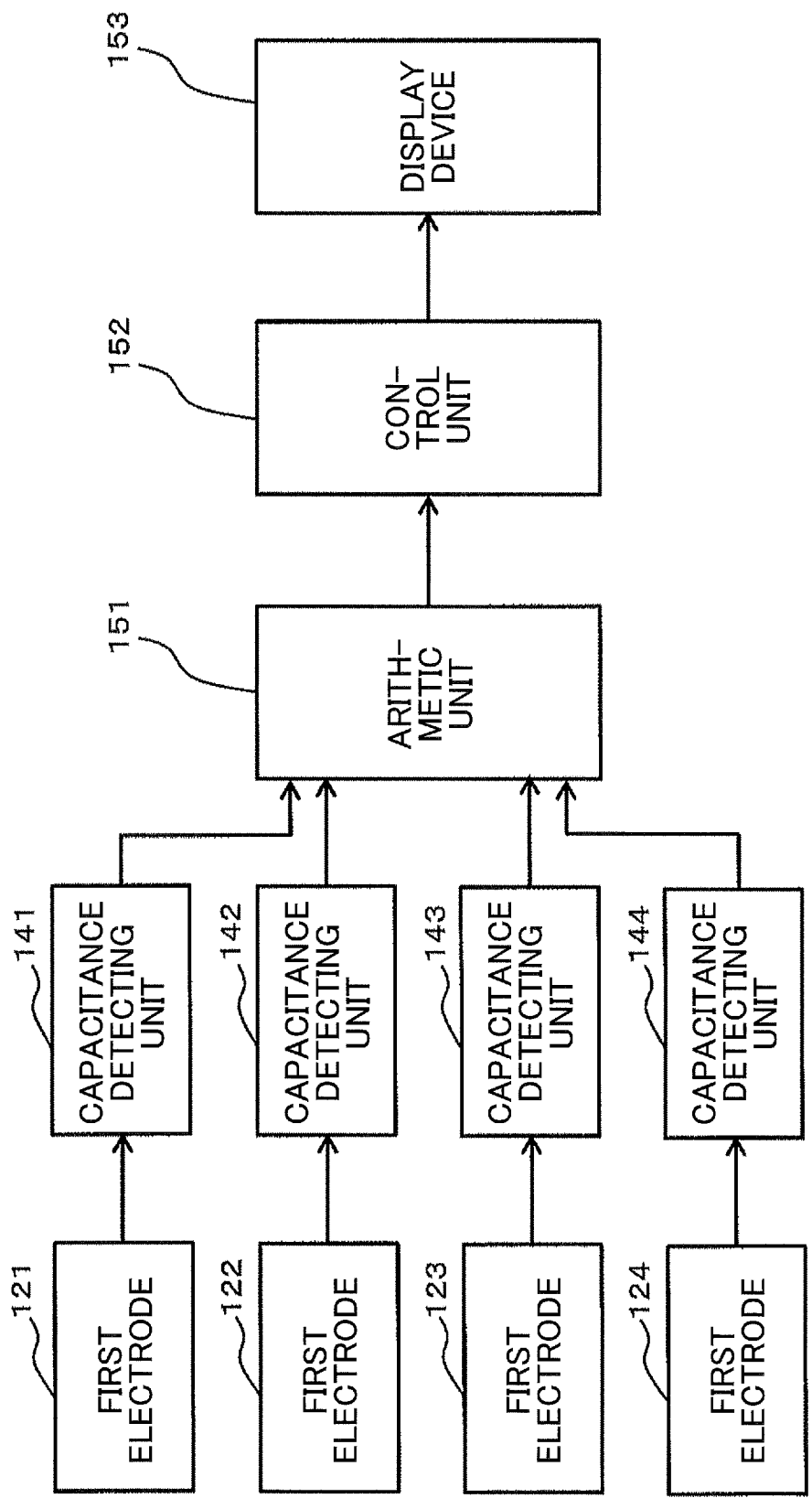

FORCE SENSOR INCLUDING A CAPACITANCE DETECTING UNIT CONFIGURED TO DETECT A CAPACITANCE CORRESPONDING TO A DISTANCE BETWEEN A FIRST ELECTRODE AND A SECOND ELECTRODE

CROSS-REFERENCE TO RELATED APPLICATION

The present application is a continuation application of International Application No. PCT/JP2018/009040 filed on Mar. 8, 2018, which is based on and claims priority to Japanese Patent Application No. 2017-060242 filed on Mar. 25, 2017. The contents of these applications are incorporated herein by reference in their entirety.

BACKGROUND OF THE INVENTION

1. Field of the Invention

The present invention relates to a force sensor capable of detecting a load applied by an operation with respect to an operation member.

2. Description of the Related Art

The load detection apparatus disclosed in Patent Document 1 includes a load sensor having a protruded pressure receiving portion, a case in which the load sensor is housed with the pressure receiving portion facing the upper surface of the case, and an elastic body disposed on the upper surface of the load sensor to push the load sensor in the height direction upon receiving a load. Accordingly, good handling properties and miniaturization are realized, and a load detection apparatus having good sensor sensitivity is provided.

Patent Document 1: Japanese Laid-open Patent Publication No. 2015-161531

SUMMARY OF THE INVENTION

According to one aspect of the present invention, there is provided a force sensor including a substrate; a first electrode fixed to a first area on the substrate; a second electrode fixed to a second area different from the first area on the substrate, the second electrode extending to a position higher than the first electrode; a capacitance detecting unit configured to detect a capacitance corresponding to a distance between the first electrode and the second electrode; and an operation member including a contact area that is in contact with the second electrode, wherein at least one of the first electrode and the second electrode is provided in plurality, and the second electrode is elastically deformed by a load applied to the second electrode by an operation with respect to the operation member, and the distance between the second electrode and the first electrode changes according to an elastic deformation of the second electrode.

BRIEF DESCRIPTION OF THE DRAWINGS

FIG. 8 is a functional block diagram of the force sensor according to the second embodiment.

DETAILED DESCRIPTION OF THE PREFERRED EMBODIMENTS

The load detection apparatus of Patent Document 1, described in the BACKGROUND OF THE INVENTION above, is capable of detecting the pushing force in the height direction by the load sensor; however, the load detection apparatus cannot detect the status of the load applied to the elastic body, such as the direction, the range, the distribution, etc., of the load. Accordingly, even if the load detection apparatus is incorporated, for example, into a structure that is remotely operated, the status of the load applied to the structure is not clear, and, therefore, the tactile transmission performed based on this detection result lacks detail, so that it is difficult to reproduce a realistic feeling.

The force sensor according to an aspect of the present invention is capable of detecting the status such as the direction, the magnitude, the range, the distribution, etc., of the applied load.

Hereinafter, a force sensor according to an embodiment of the present invention will be described in detail with reference to the drawings.

First Embodiment

Figure 1:
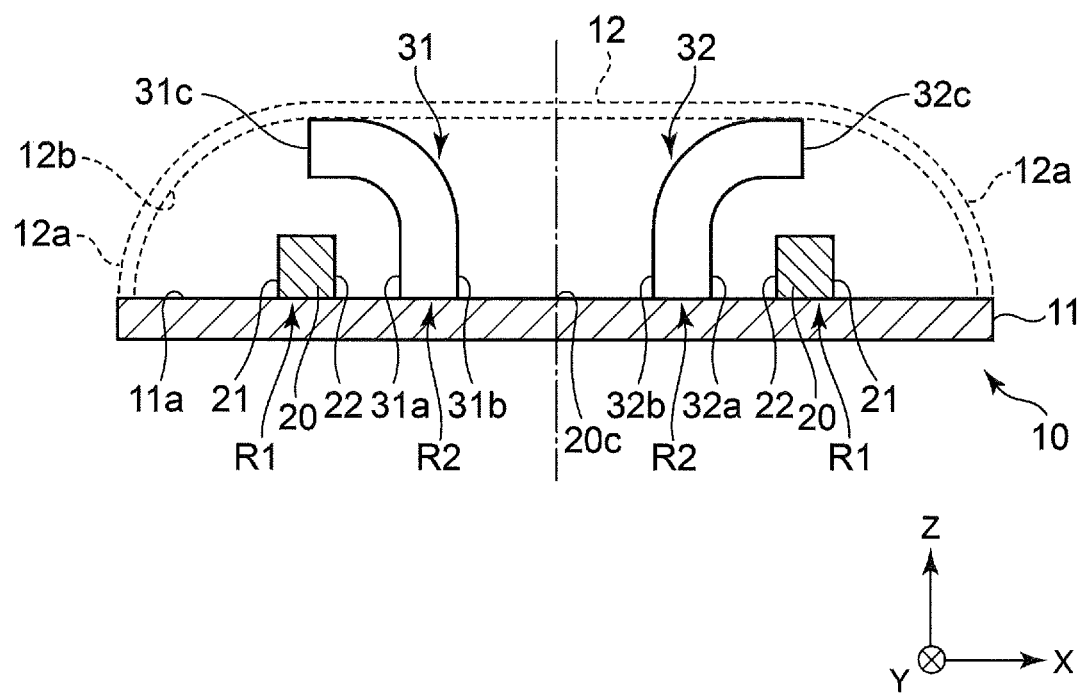
FIG. 1 is a cross-sectional view illustrating a configuration of a force sensor according to a first embodiment.
Figure 2:
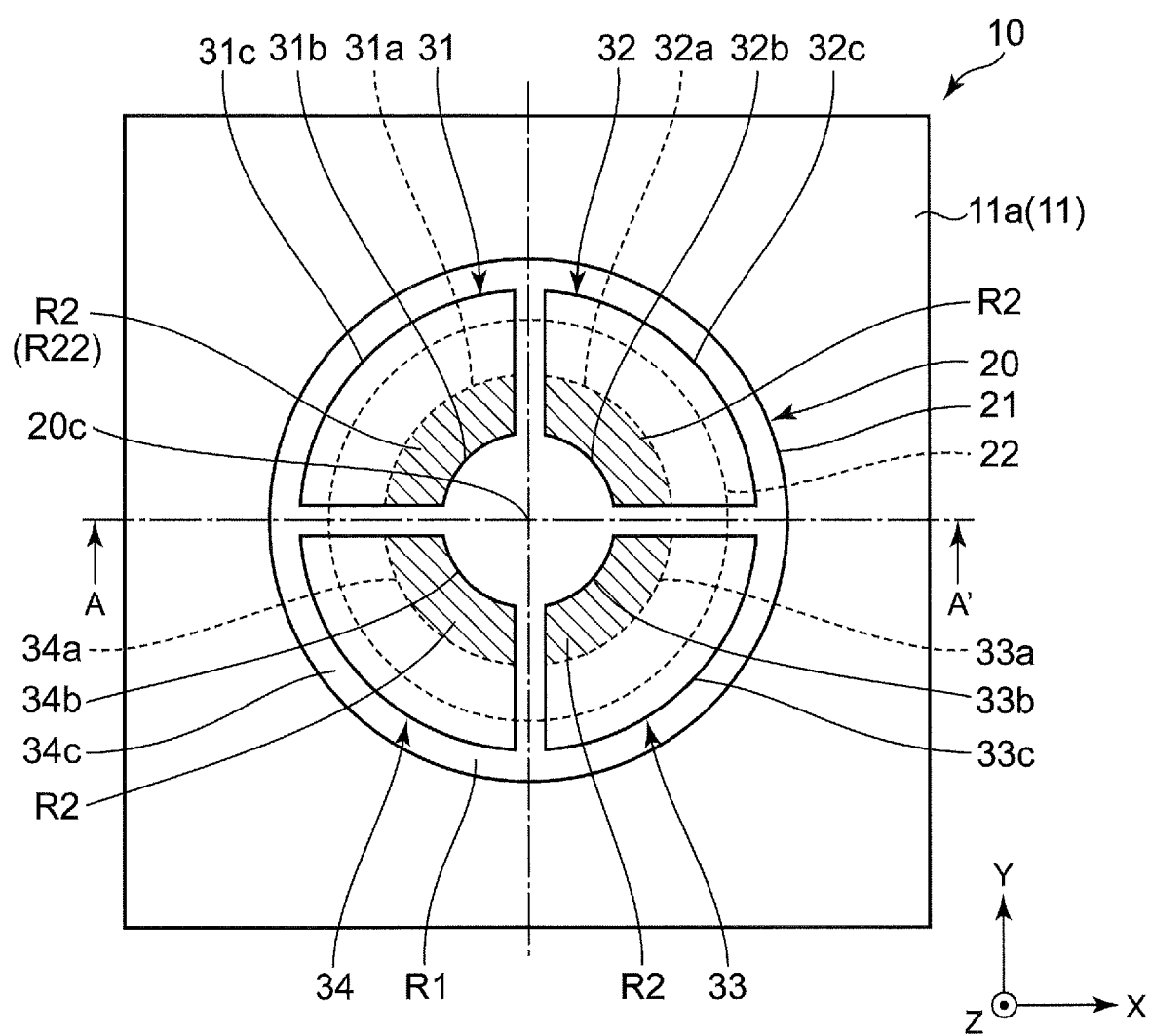
FIG. 2 is a plan view illustrating a configuration of the force sensor according to the first embodiment.
Figure 3:
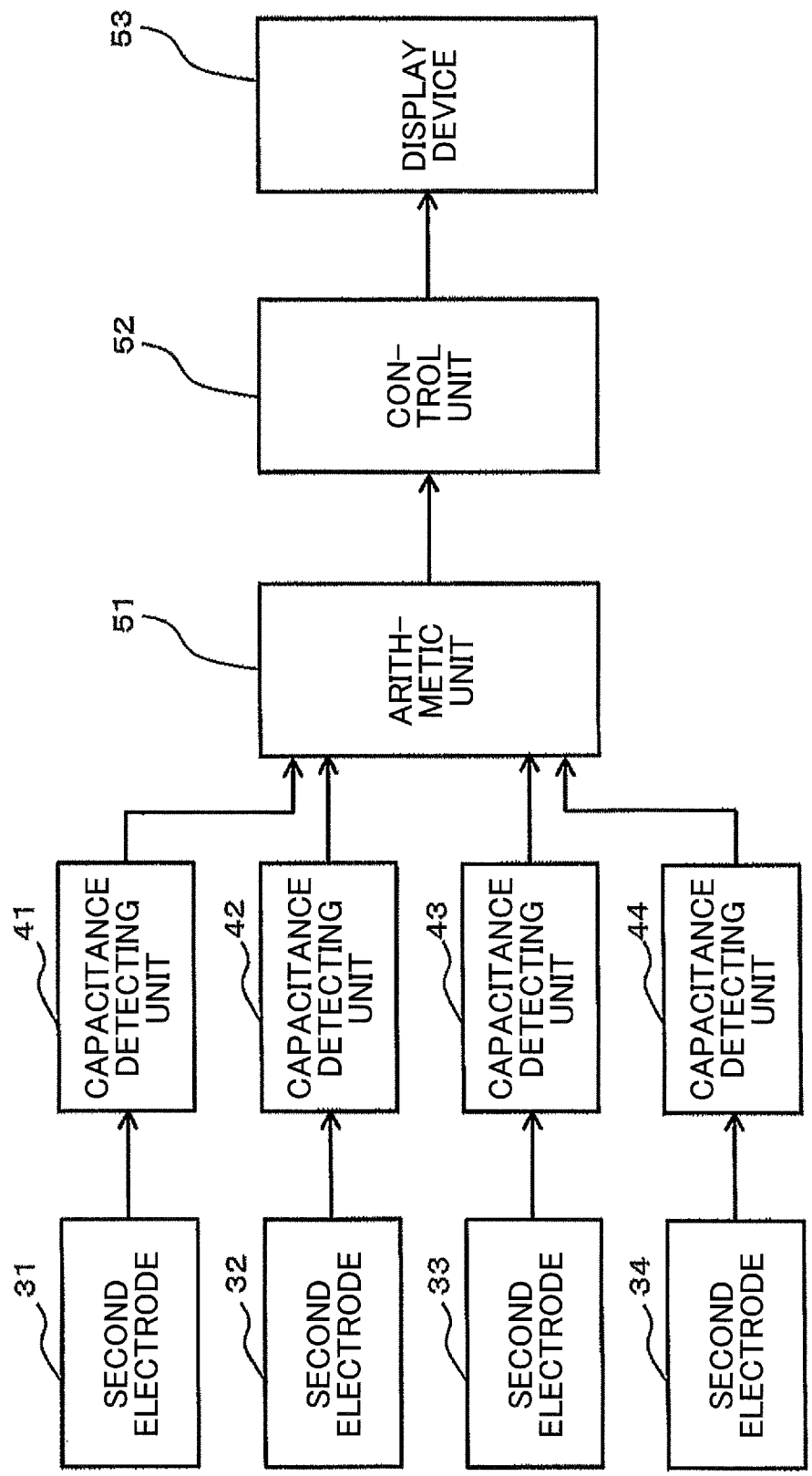
FIG. 3 is a functional block diagram of the force sensor according to the first embodiment.
Figure 4:
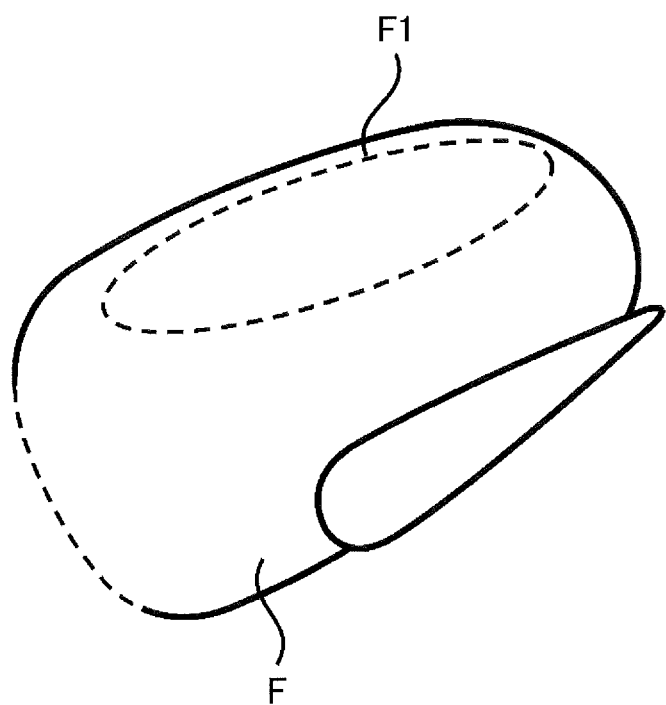
FIG. 4 is a diagram illustrating an example of an application of the force sensor according to the first embodiment.

FIG. 1 is a cross-sectional view illustrating the configuration of a force sensor 10 according to the first embodiment, FIG. 2 is a plan view illustrating the configuration of the force sensor 10, and FIG. 3 is a functional block diagram of the force sensor 10. FIG. 4 is a diagram illustrating an example of an application of the force sensor 10. FIG. 1 corresponds to a front view viewed from a cross-section cut along a line A-A' in FIG. 2. An operation member 12 is virtually illustrated by dashed lines in FIG. 1 and is omitted in FIG. 2. Some of the figures illustrate the X-Y-Z coordinate axes as reference coordinate axes. The Z-direction is an upward direction, and the X-Y plane is a plane perpendicular to the Z-direction. In the following description, the state viewed along the Z-direction may be referred to as a planar view.

As illustrated in FIG. 1 or 2, the force sensor 10 according to the first embodiment includes a substrate 11, and on the substrate 11, the operation member 12, a first electrode 20, and four second electrodes 31, 32, 33, and 34 are provided.

The first embodiment indicates an example including four second electrodes; however, the number of the second electrodes may be two, three, or five or more, and the number and arrangement of the second electrodes may be arbitrarily set according to the specifications, etc., of the force sensor.

The substrate 11 is a non-conductive plate material made of glass, plastic, or the like, and is a circuit board, for example. On the substrate 11, an integrated circuit configuring an arithmetic unit 51 and a control unit 52 illustrated in FIG. 3, and wirings and the like connected thereto are disposed. The control unit 52 includes an interface unit and, for example, provides the calculation result by the arithmetic unit 51 to an external display device 53 to be displayed.

The operation member 12 is formed of a non-conductive and elastic material, for example, synthetic rubber, such as urethane rubber or silicone rubber, and is disposed so as to cover the top portions of the four second electrodes 31, 32, 33, and 34 from the upper side in the Z-direction, and the operation member 12 has an end portion 12a in the X-Y plane direction that is fixed to the substrate 11 by adhesion. The operation member 12 forms a contact area in which an inner surface 12b thereof contacts the top portions of the four second electrodes 31, 32, 33, and 34.

The operation member 12 forms an epidermis F1 of a finger F of a human body model, for example, as illustrated in FIG. 4. In this configuration, the substrate 11 and the four second electrodes 31, 32, 33, and 34 fixed on the substrate 11, are disposed inside the finger F.

As illustrated in FIG. 2, the first electrode 20 is provided on a surface 11a of the substrate 11 to form one ring identical to a first area R1, on the ring-like first area R1 centered around a plane center 20c. The plane center 20c coincides with the center of the substrate 11 that is a square in a planar view. The first electrode 20 is formed of a conductive material. The first electrode 20 may be formed, for example, by fixing a thin sheet of a metal material, such as phosphor bronze, on the surface 11a of the substrate 11 by adhesion, or by etching copper foil, sputtering ITO (indium tin oxide), PVD (physical vapor deposition), or CVD (chemical vapor deposition).

As illustrated in FIG. 1, a lower portion of the second electrode 31 is fixed to a second area R2 on the surface 11a of the substrate 11. Here, as illustrated with diagonal lines in FIG. 2, the second area R2 is disposed on the inner side of the first electrode 20, i.e., on the side of the plane center 20c of the first electrode 20, in the radial direction of the ring-like first electrode 20, and the second area R2 is divided into four areas at equal angular intervals, in the circumferential direction of the first electrode 20. The second electrode 31 is disposed to equally overlap an area R22 corresponding to the second quadrant of the X-Y plane, in the second area R2. Further, the second electrode 31 extends upward from the surface 11a of the substrate 11, and an outer peripheral surface 31a at the lower portion of the second electrode 31 faces an inner peripheral surface 22 of the first electrode 20.

The second electrode 31 is formed of a conductive and elastic material, such as phosphor bronze, conductive plastic, or conductive rubber. Alternatively, the second electrode 31 may be formed of elastically deformable insulating plastic, and an electric conductor may be formed on the second electrode 31 at the portion facing the first electrode 20. The second electrode 31 is curved so that an end surface 31c of the upper portion (tip) thereof is positioned above the first electrode 20 positioned outside the second electrode 31. Here, as illustrated in FIG. 1, the end surface 31c extends to a position in the middle of an outer peripheral surface 21 and the inner peripheral surface 22 of the first electrode 20, in the radial direction of the first electrode 20. The second electrode 31 and the first electrode 20 are separated from each other, and the second electrode 31 is elastically deformed when a load is applied by an operation of the operation member 12 in contact with the second electrode 31. This elastic deformation changes the distance between the second electrode 31 and the first electrode 20.

The first electrode 20 and the second electrodes 31, 32, 33, and 34 have one end set to ground potential and another end connected to capacitance detecting units 41, 42, 43, and 44 illustrated in FIG. 3.

In the first embodiment illustrated in FIG. 3, the first electrode 20 is set to ground potential, and the second electrodes 31, 32, 33, and 34 are connected to the capacitance detecting units 41, 42, 43, and 44, respectively.

However, as in the second embodiment described below based on FIG. 6, the first electrode 20, which is divided into four electrodes, may be individually connected to the capacitance detecting units 41, 42, 43, and 44, and the second electrodes 31, 32, 33, and 34 may be set to ground potential. In this case, the second electrodes may be formed of a deformable conductive material and may be formed in a doughnut-like shape so as to be continuous in the circumferential direction.

In the first embodiment, as illustrated in FIG. 3, the second electrode 31 is connected to the capacitance detecting unit 41. When no load is applied to the second electrode 31, the detection output from the second electrode 31 is a value corresponding to the parasitic capacitance of the initial opposing distance between the second electrode 31 and the first electrode 20. When the second electrode 31 is elastically deformed by applying a load to the second electrode 31, the opposing distance between the second electrode 31 and the first electrode 20 changes, and the capacitance changes according to the change in the opposing distance. The capacitance detecting unit 41 detects a change in the capacitance based on the variation in the opposing distance, as a changed output of the own capacitance from the second electrode 31.

The three second electrodes 32, 33, and 34 other than the second electrode 31 have the same configuration as the second electrode 31, and each of the second electrodes 32, 33, and 34 is disposed in a corresponding quadrant of the X-Y plane. Specifically, as illustrated in FIG. 2, the four second electrodes 31, 32, 33, and 34 have a configuration in which an electrode having a ring-like shape in a planar view is divided into four electrodes and the divided electrodes are spaced apart from each other so as to be symmetrical with each other with respect to the plane center 20c of the first electrode 20 or to be spaced apart at equal angular intervals about the plane center 20c. Thus, the second electrodes 31, 32, 33, and 34 are not electrically conductive with each other. Outer peripheral surfaces 31a, 32a, 33a, and 34a and inner peripheral surfaces 31b, 32b, 33b, and 34b at the lower portions of the second electrodes 31, 32, 33, and 34 are fixed to the surface 11a of the substrate 11, and are arranged along the inner peripheral surface 22 of the first electrode 20, respectively.

Similar to the second electrode 31, the three second electrodes 32, 33, and 34 are also made of a material having conductivity and elasticity, and are curved so that end surfaces 32c, 33c, and 34c on the upper portions thereof are positioned above the first electrode 20 at opposing positions, respectively. Similar to the second electrode 31, each of the other three second electrodes 32, 33, and 34, and the first electrode 20, is spaced apart from each other. When a load is applied to the second electrodes 32, 33, and 34 contacting the operation member 12 by an operation of the operation member 12, the second electrodes 32, 33, and 34 are elastically deformed, and this elastic deformation changes the distance between each of the second electrodes 32, 33, and 34 and the first electrode 20. According to this change in distance, the capacitance detecting units 42, 43, and 44, to which the second electrodes 32, 33, and 34 are respectively connected, detect this change as an output corresponding to the change in the capacitance due to the elastic deformation of the second electrodes 32, 33, and 34. Here, the intervals between the second electrodes 31, 32, 33, and 34 in the circumferential direction of the first electrode 20, and the interval between the first electrode 20 and each of the second electrodes 31, 32, 33, and 34 in a state of not being elastically deformed, may be arbitrarily set depending on the purpose and specifications.

As illustrated in FIG. 3, the detection outputs from the capacitance detecting units 41, 42, 43, and 44 are provided to the arithmetic unit 51, respectively. The arithmetic unit 51 detects the status of the load applied to the operation member 12 based on the output information provided from the capacitance detecting units 41, 42, 43, 44.

The force sensor 10 having the above-described configuration can detect the status, for example, the direction, the magnitude, the range, the distribution, etc., of the load applied by external forces as illustrated in FIGS. 5A to 5E. Here, FIGS. 5A to 5E are cross-sectional views corresponding to FIG. 1, and are diagrams illustrating the direction of the external force applied to the force sensor 10, and the illustration of the operation member 12 is omitted. FIGS. 5A to 5E are some examples, and loads other than these, for example, a status of a load according to a combination of the external forces illustrated in FIGS. 5A to 5E, can also be detected. Further, the following explanation of FIGS. 5A to 5E is described with the assumption that the force sensor 10 is mounted so that the Z direction is along the vertical direction, but the mounting direction of the force sensor 10 is not limited thereto.

Figure 5A:
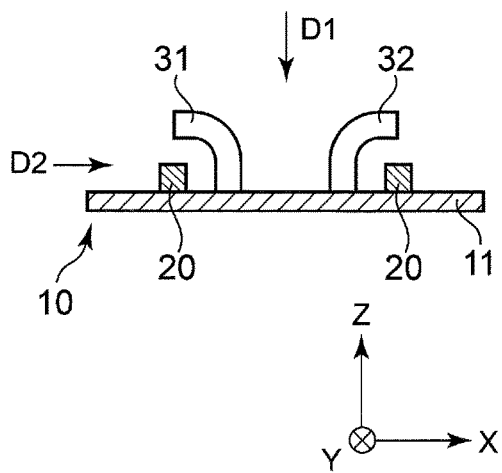
FIGS. 5A to 5E are diagrams illustrating the direction of the external force applied to the force sensor according to the first embodiment.

First, as illustrated in FIG. 5A, when the operation member 12 (not illustrated in FIG. 5A) is pushed downward from the upward direction, a downward force D1 acts on all of the four second electrodes 31, 32, 33, and 34, resulting in elastic deformation of the four second electrodes 31, 32, 33, and 34 so as to approach the corresponding first electrode 20. When the operation member 12 is subjected to an operation of being crushed from the upper direction and the left direction, a force D2 along the X direction acts as a force in the horizontal direction, in addition to the force D1. In this case, the elastic deformation is superimposed so that the two second electrodes 32 and 33 positioned on the right side in a planar view further approach the corresponding first electrode 20. Alternatively, the second electrodes 31 and 34 positioned on the left side in a planar view are deformed to move away from the first electrodes 20 facing the second electrodes 31 and 34. According to a change in the distance between each of the second electrodes 31, 32, 33, and 34 and the first electrode 20 due to such elastic deformation, a change occurs in the capacitance detected by each of the capacitance detecting units 41, 42, 43, and 44. Based on this change, the arithmetic unit 51 can detect the status such as the direction, the magnitude, the range, the distribution, etc. of the load applied to the operation member 12.

Figure 5D:
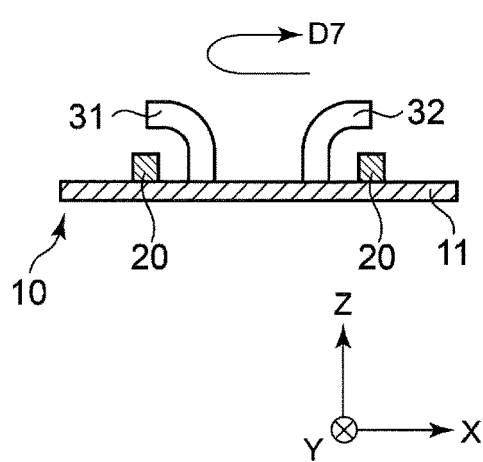
Figure 5B:
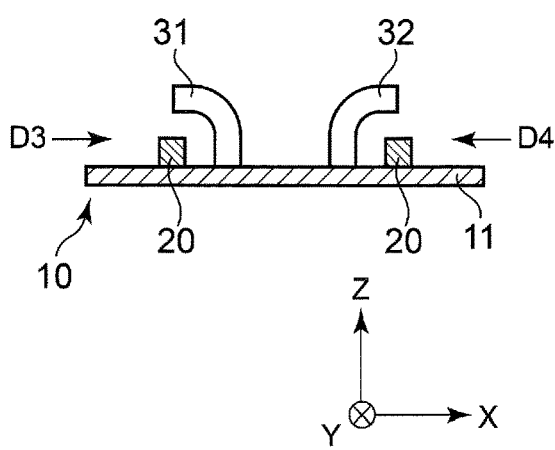

In FIG. 5B, two forces D3 and D4 along the positive and negative directions in the X direction are illustrated as forces from both the left and right directions. As a case where such external forces are applied, it is assumed that the operation member 12 is pinched from the right and left directions. When an operation is performed so that such forces D3 and D4 are applied simultaneously, all of the four second electrodes 31, 32, 33, and 34 are elastically deformed so as to move away from the corresponding first electrode 20, respectively. According to a change in the distance from the first electrode 20 due to such elastic deformation, a change occurs in the capacitance detected by each of the capacitance detecting units 41, 42, 43, and 44. Based on this change, the arithmetic unit 51 can detect the status such as the direction, the magnitude, the range, the distribution, etc., of the load applied to the operation member 12.

Figure 5E:
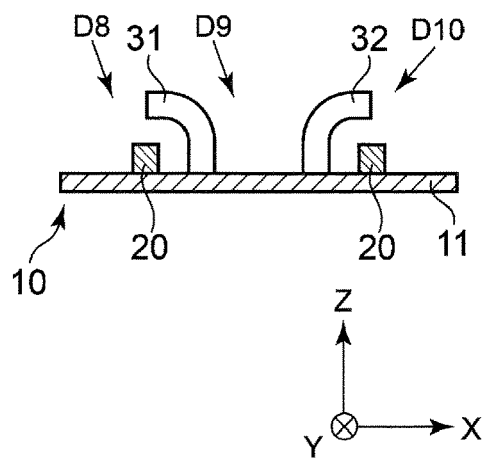
Figure 5C:
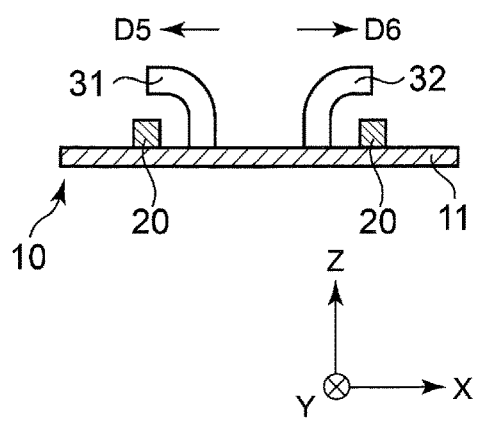

In FIG. 5C, two forces D5 and D6 along the negative and positive directions in the X direction are illustrated as forces along both the left and right directions. As a case where such external forces are applied, it is assumed that the operation member 12 is expanded in the right and left directions. When an operation is performed so that such forces D5, D6 are applied simultaneously, all of the four second electrodes 31, 32, 33, and 34 are elastically deformed so as to approach the corresponding first electrode 20, respectively. According to a change in the distance from the first electrode 20 due to such elastic deformation, a change occurs in the capacitance detected by each of the capacitance detecting units 41, 42, 43, and 44. Based on this change, the arithmetic unit 51 can detect the status such as the direction, the magnitude, the range, the distribution, etc. of the load applied to the operation member 12.

FIG. 5D illustrates a force D7 that rotates in a plane parallel to the X-Y plane. As a case where such an external force is applied, it is assumed that the operation member 12 is twisted about the vertical axis. Alternatively, it is assumed that a rotating force is applied to the operation member 12 such that a pushing force is applied in sequential order to the four second electrodes 31, 32, 33, and 34. When an operation is performed so that such a force D7 is applied, the four second electrodes 31, 32, 33, and 34 are elastically deformed in sequential order so as to approach or move away from the corresponding first electrode 20, depending on the direction of rotation by force D7. According to a change in the distance from the first electrode 20 due to such elastic deformation, a change occurs in the capacitance detected by each of the capacitance detecting units 41, 42, 43, and 44. Based on this change, the arithmetic unit 51 can detect the status such as the direction, the magnitude, the range, the distribution, etc. of the load applied to the operation member 12.

FIG. 5E illustrates forces D8, D9, and D10 in different directions. As a case in which such external forces are applied, it is assumed that the operation member 12 is pushed while being twisted, or that the operation member 12 is moved differently by a plurality of fingers. When an operation is performed so that such forces D8 to D10 are applied simultaneously, the four second electrodes 31, 32, 33, and 34 are elastically deformed so as to approach or move away from the corresponding first electrode 20, depending on the direction of the forces D8 to D10. According to a change in the distance from the first electrode 20 due to such elastic deformation, a change occurs in the capacitance detected by each of the capacitance detecting units 41, 42, 43, and 44. Based on this change, the arithmetic unit 51 can detect the status such as the direction, the magnitude, the range, the distribution, etc. of the load applied to the operation member 12.

In the above descriptions of FIGS. 5A to 5E, it is stated that the four second electrodes are elastically deformed. However, even when three or less second electrodes are elastically deformed, the status of the load applied to the operation member 12 can be detected.

According to the force sensor according to the first embodiment having the configuration as described above, it is possible to precisely detect the status, such as the direction, the magnitude, the range, the distribution, etc., of the load applied to the operation member 12.

The first electrode 20 forms a single ring-like shape on the substrate 11, and the four second electrodes 31, 32, 33, and 34 are fixed to the substrate 11 on the inner side of the ring-like shape of the first electrode 20, and the four second electrodes 31, 32, 33, and 34 are curved and extended to a position above the first electrode 20. With this configuration, the first electrode 20 and the second electrodes 31, 32, 33, and 34 can be efficiently disposed while ensuring the detection precision.

The four second electrodes 31, 32, 33, and 34 are disposed in a divided manner so as to be symmetrical with respect to the plane center 20c of the first electrode 20. Therefore, it is possible to detect the status of the load in various directions and ranges.

The operation member 12 is mounted on the substrate 11 so as to cover the four second electrodes 31, 32, 33, and 34, and, therefore, the load applied by an operation of the operation member 12 can be detected by the four second electrodes, so that it is possible to detect the status of the load that is applied in a complex manner.

Further, the operation member 12 has elasticity, thereby providing a realistic feeling to the operator, while enabling precise detection of the status of the applied load.

Modification examples are described in the following.

In the first embodiment, the first electrode 20 is disposed in the first area R1, and the second electrodes 31, 32, 33, and 34 are disposed in the second area R2 on the inner side of the first area R1. Alternatively, four second electrodes may be disposed outside the first electrode, and the tip portion of the second electrode may be curved so as to reach a position above the first electrode.

In the first embodiment, the first electrode 20 is grounded to detect the capacitance (own capacitance) that changes according to the deformation of the second electrodes 31, 32, 33, and 34. Alternatively, as described above, the first electrode 20 may be configured as a driving electrode and the second electrodes 31, 32, 33, and 34 may be configured as detecting electrodes. In this configuration, a current of a predetermined waveform is applied to each of the driving electrode and the detecting electrodes, to detect a change in the mutual capacitance between the driving electrode and the detecting electrodes, that changes according to the deformation of the second electrodes.

Second Embodiment

Next, a second embodiment will be described. In the second embodiment, the first electrode is also divided into four electrodes respectively corresponding to four second electrodes 131, 132, 133, and 134, and the second electrodes 131, 132, 133, and 134 are electrically connected to each other by a conducting plate 135, which are the different points from the first embodiment. In the second embodiment, with respect to configurations similar to those of the first embodiment, detailed descriptions thereof are omitted.

Figure 6:
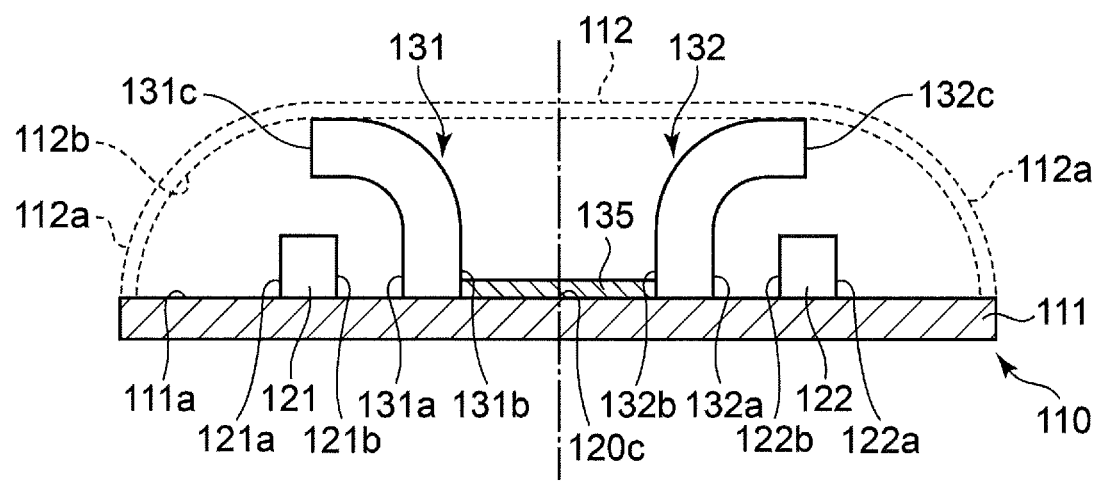
FIG. 6 is a cross-sectional view illustrating a configuration of a force sensor according to a second embodiment.
Figure 7:
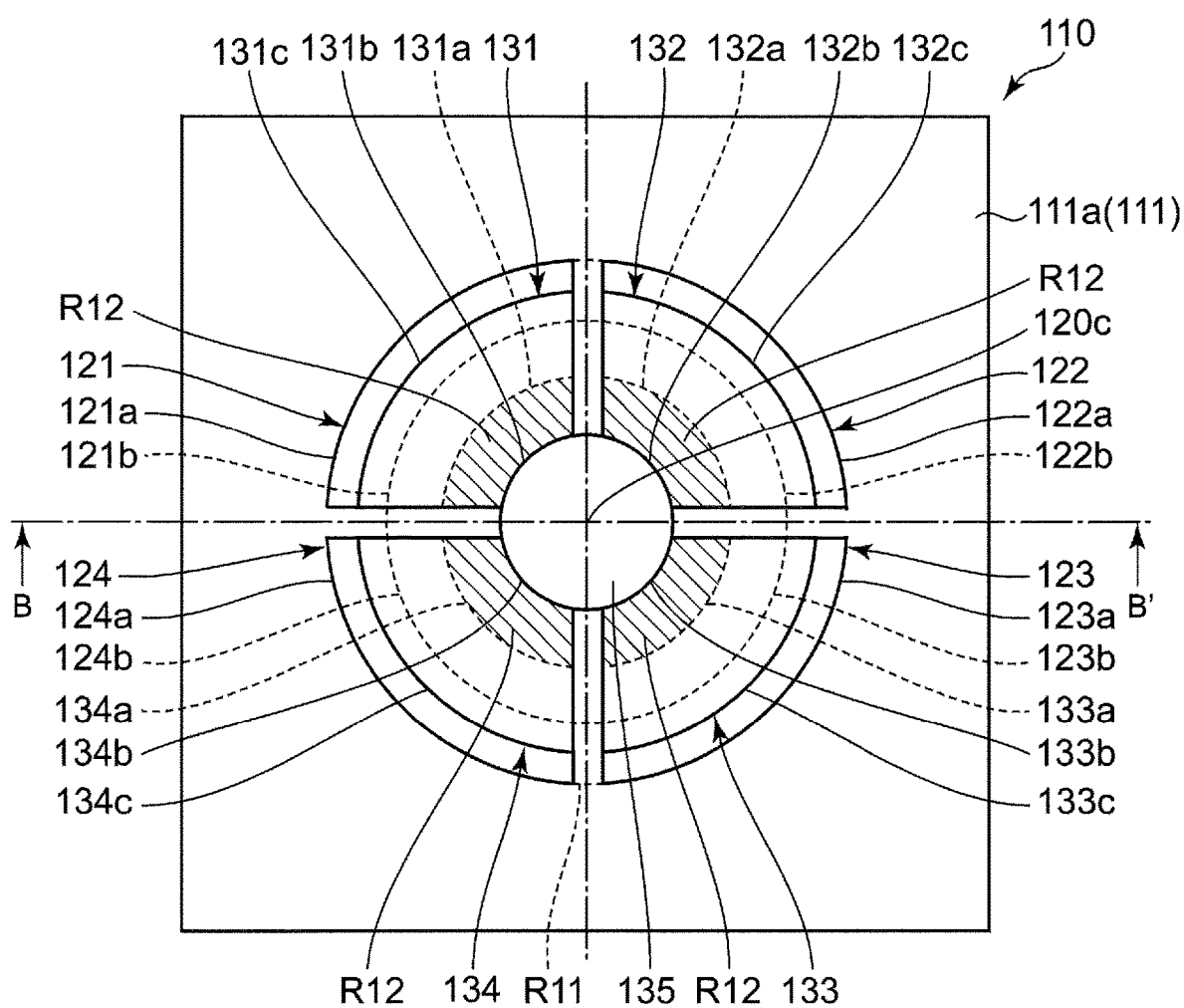
FIG. 7 is a plan view illustrating a configuration of the force sensor according to the second embodiment.

FIG. 6 is a cross-sectional view illustrating the configuration of a force sensor 110 according to the second embodiment, FIG. 7 is a plan view illustrating the configuration of the force sensor 110, and FIG. 8 is a functional block diagram of the force sensor 110. FIG. 6 corresponds to a front view viewed from a cross-section cut along a line B-B' of FIG. 7. An operation member 112 is virtually illustrated by dashed lines in FIG. 6 and is omitted in FIG. 7. FIGS. 6 and 7 illustrate the X-Y-Z coordinate axes as reference coordinate axes, as in FIGS. 1, 2, and 5A to 5E.

As illustrated in FIG. 6 or 7, the force sensor 110 according to the second embodiment includes a substrate 111, and on the substrate 111, the operation member 112, four first electrodes 121, 122, 123, and 124, the four second electrodes 131, 132, 133, and 134, and the conducting plate 135 are provided.

The substrate 111 has the same configuration as the substrate 11 of the first embodiment. On the substrate 111, an integrated circuit configuring an arithmetic unit 151 and a control unit 152 illustrated in FIG. 8, and wirings and the like connected thereto are disposed. The control unit 152 includes an interface unit and, for example, provides the calculation result by the arithmetic unit 151 to an external display device 153 to be displayed.

The operation member 112 has the same configuration as the operation member 12 of the first embodiment. The operation member 112 is disposed so as to cover the top portions of the four second electrodes 131, 132, 133, and 134 from the upper side in the Z direction, and the operation member 112 has an end portion 112a in the X-Y plane direction that is fixed to the substrate 111 by adhesion. The operation member 112 forms a contact area in which an inner surface 112b thereof contacts the top portions of the four second electrodes 131, 132, 133, and 134.

As illustrated in FIG. 7, the four first electrodes 121, 122, 123, and 124 are formed by dividing an electrode into four electrodes that are spaced apart at equal angular intervals in a ring-like first area R11 about a planar center 120c, and are arranged symmetrically with each other with respect to the planar center 120c. The planar center 120c coincides with the center of the substrate 111 that is a square in a planar view. These first electrodes 121, 122, 123, and 124 are formed of a conductive material similar to the first electrode 20 of the first embodiment.

The four second electrodes 131, 132, 133, and 134 have the same configuration as the second electrodes 31, 32, 33, and 34 of the first embodiment, and the lower portions of the second electrodes 131, 132, 133, and 134 are fixed to a second area R12 on a surface 111a of the substrate 111. As illustrated with diagonal lines in FIG. 7, the second area R12 is disposed on the inner side of the four first electrodes 121, 122, 123, and 124, in the radial direction of the ring-like four first electrodes 121, 122, 123, and 124, and is divided into four areas at equal angular intervals in the circumferential direction so as to face the respective four first electrodes 121, 122, 123, and 124.

The four second electrodes 131, 132, 133, and 134 are curved so that end surfaces 131c, 132c, 133c, and 134c of the upper portion (tip) thereof are positioned above the four first electrodes 121, 122, 123, and 124, respectively, positioned outside the second electrodes 131, 132, 133, and 134. As illustrated in part in FIG. 6, the end surfaces 131c, 132c, 133c, and 134c extend to a position in the middle of outer peripheral surfaces 121a, 122a, 123a, and 124a and inner peripheral surfaces 121b, 122b, 123b, and 124b of the corresponding first electrodes, in the radial direction of the four first electrodes 121, 122, 123, and 124. In addition, the second electrodes 131, 132, 133, and 134 and the corresponding first electrodes 121, 122, 123, and 124, are separated from each other, respectively, and when a load is applied to the second electrodes 131, 132, 133, and 134 in contact with the operation member 112 by an operation of the operation member 112, the second electrodes 131, 132, 133, and 134 are elastically deformed, respectively. This elastic deformation changes the distance between each second electrode and the corresponding first electrode 121, 122, 123, and 124.

At the planar center of the substrate 111, the disc-like conducting plate 135 is concentrically provided. The conducting plate 135 is provided to electrically communicate with inner peripheral surfaces 131b, 132b, 133b, and 134b of the four second electrodes 131, 132, 133, and 134, and is grounded by a wiring that is not illustrated. The conductive plate 135 is formed of a conductive material, for example, and is formed by fixing a thin sheet of a metal material, such as phosphor bronze, on the surface 111a of the substrate 111 by adhesion, or by etching copper foil, sputtering ITO (indium tin oxide), PVD (physical vapor deposition), or CVD (chemical vapor deposition). The second electrodes 131, 132, 133, and 134 and the conductive plate 135 may be integrally manufactured by molding.

As illustrated in FIG. 8, the first electrodes 121, 122, 123, and 124 are connected to capacitance detecting units 141, 142, 143, and 144, respectively. When no load is applied to the second electrodes 131, 132, 133, and 134, current flows to each of the first electrodes 121, 122, 123, and 124, depending on the parasitic capacitance between the second electrodes 131, 132, 133, and 134 and the corresponding first electrodes 121, 122, 123, and 124. Here, when a load is applied on one of the second electrodes 131, 132, 133, and 134 and the corresponding second electrode is elastically deformed, the distance between the deformed second electrode and the corresponding first electrode changes, and, therefore, the capacitance (own capacitance) changes according to the change in this distance, thereby changing the current flowing into the corresponding first electrode. The capacitance detecting unit corresponding to the first electrode detects a change in the current caused by the elastic deformation of the second electrode, as a change in the capacitance. The outputs from the capacitance detecting units 141, 142, 143, and 144 are provided to the arithmetic unit 151, respectively. The arithmetic unit 151 detects the status of the load applied to the operation member 112, based on the output information provided by the capacitance detecting units 141, 142, 143, and 144.

Further, other configurations, functions, effects, and modification examples are the same as those of the first embodiment.

As described above, the force sensor according to the present invention is useful in that the force sensor can detect the status, such as the direction, the magnitude, the range, the distribution, etc., of the load applied to the operation member.

According to an aspect of the present invention, a force sensor capable of detecting the status such as the direction, the magnitude, the range, the distribution, etc., of the load applied to an operation member, is provided.

According to an aspect of the present invention, a force sensor includes a substrate; a first electrode fixed to a first area on the substrate; a second electrode fixed to a second area different from the first area on the substrate, the second electrode extending to a position higher than the first electrode; a capacitance detecting unit configured to detect a capacitance corresponding to a distance between the first electrode and the second electrode; and an operation member including a contact area that is in contact with the second electrode, wherein at least one of the first electrode and the second electrode is provided in plurality, and the second electrode undergoes elastic deformation due to a load applied to the second electrode by an operation with respect to the operation member, and the distance between the second electrode and the first electrode changes according to the elastic deformation.

Accordingly, it is possible to precisely detect the status such as the direction, the magnitude, the distribution, etc., of the load applied to the operation member.

The force sensor according to an aspect of the present invention preferably includes an arithmetic unit configured to detect a status of the load applied to the operation member, based on output information from the capacitance detecting unit.

Accordingly, it is possible to accurately detect the status such as the direction, the magnitude, the distribution, etc., of the load applied to the operation member.

In the force sensor according to an aspect of the present invention, it is preferable that the first electrode forms a single ring shape on the substrate, and the second electrode is fixed to the substrate on an inner side of the ring shape of the first electrode, and the second electrode is curved and extended to the position above the first electrode.

Accordingly, the first electrode and the second electrode can be efficiently disposed while ensuring the detection precision.

In the force sensor according to an aspect of the present invention, it is preferable that the second electrode is divided into four electrodes so as to be symmetrical with respect to a plane center of the first electrode having the ring shape.

Accordingly, it is possible to detect the statuses of loads in various directions and ranges.

In the force sensor according to an aspect of the present invention, it is preferable that the operation member is mounted on the substrate so as to cover the second electrode.

Accordingly, the load applied by the operation with respect to the operation member can be detected with a plurality of electrodes, and, therefore, it is possible to detect the status of the load applied in a complex manner.

Although the present invention has been described with reference to the above-described embodiments, the present invention is not limited to the above-described embodiments, and may be improved or modified for purposes of improvement or within the spirit of the invention.

What is claimed is:
1. A force sensor comprising:
a substrate;
a first electrode fixed to a first area on the substrate;
a second electrode fixed to a second area different from the first area on the substrate, the first area and the second area being positioned on a same plane, the second electrode extending to a position higher than the first electrode;
a capacitance detecting unit configured to detect a capacitance corresponding to a distance between the first electrode and the second electrode; and
an operation member including a contact area that is in contact with the second electrode, wherein
at least one of the first electrode and the second electrode is provided in plurality, and
the second electrode is elastically deformed by a load applied to the second electrode by an operation with respect to the operation member, and the distance between the second electrode and the first electrode changes according to an elastic deformation of the second electrode,
wherein
the first electrode forms a single ring shape on the substrate, and
the second electrode is fixed to the substrate on an inner side of the ring shape of the first electrode, and the second electrode is curved and extended to a position above the first electrode.

2. The force sensor according to claim 1, further comprising:
   an arithmetic unit configured to detect a status of the load applied to the operation member, based on output information from the capacitance detecting unit.

3. The force sensor according to claim 1, wherein
   the second electrode is divided into four electrodes so as to be symmetrical with respect to a plane center of the first electrode having the ring shape.

4. The force sensor according to claim 1, wherein
   the operation member is mounted on the substrate so as to cover the second electrode.

5. The force sensor according to claim 1, wherein
   the second electrode is fixed to the substrate at one terminal portion of the second electrode and bent toward the first electrode so that another terminal portion that is opposite to the one terminal portion is positioned above the first electrode.

6. The force sensor according to claim 1, wherein the first electrode is configured to continuously and circularly extend so as to form the single ring shape.

\* \* \* \* \*